(12) United States Patent
Steele, IV et al.

(10) Patent No.: US 8,074,817 B1
(45) Date of Patent: *Dec. 13, 2011

(54) METHOD AND APPARATUS FOR METERING LIQUID NUTRITIONAL SUPPLEMENTS

(75) Inventors: William E. Steele, IV, Fort Worth, TX (US); Phillip D. Livingston, Dallas, TX (US); Clarence D. Zierhut, Garland, TX (US)

(73) Assignee: Remington Health Products, L.L.C., Fort Worth, TX (US)

( * ) Notice: Subject to any disclaimer, the term of this patent is extended or adjusted under 35 U.S.C. 154(b) by 1028 days.

This patent is subject to a terminal disclaimer.

(21) Appl. No.: 11/870,302

(22) Filed: Oct. 10, 2007
(Under 37 CFR 1.47)

Related U.S. Application Data

(63) Continuation-in-part of application No. 10/193,382, filed on Jul. 11, 2002, now Pat. No. 7,296,700.

(51) Int. Cl.
*B65D 39/08* (2006.01)
*B65D 41/04* (2006.01)
*B65D 85/00* (2006.01)
*G01F 19/00* (2006.01)

(52) U.S. Cl. ........ 215/228; 215/204; 215/217; 215/221; 215/230; 215/DIG. 7; 206/828; 73/428

(58) Field of Classification Search ............... 215/228, 215/DIG. 3, DIG. 7, 217, 204, 230, 382, 215/226, DIG. 4, 215–221; 40/311; 206/217, 206/828; 220/256.1; D9/436, 445, 434, D9/435; 73/427, 428

See application file for complete search history.

(56) References Cited

U.S. PATENT DOCUMENTS

| | | | |
|---|---|---|---|
| 525,753 A | 9/1894 | Turner | |
| 526,772 A | 10/1894 | Dickerson | |
| 2,656,842 A | 10/1953 | Ammarell | |
| 3,203,577 A * | 8/1965 | Parker | 220/799 |
| 3,774,800 A | 11/1973 | Lohwasser et al. | |

(Continued)

FOREIGN PATENT DOCUMENTS

CH 376 049 4/1964

(Continued)

OTHER PUBLICATIONS

International Search Report in PCT/US03/21486, dated Apr. 13, 2004.

(Continued)

*Primary Examiner* — Robin Hylton
(74) *Attorney, Agent, or Firm* — Klemchuk Kubasta LLP

(57) ABSTRACT

A method and apparatus for metering a liquid nutritional supplement is disclosed and provides a liquid dispenser having a body that contains a predetermined number of single dosages of the liquid nutritional supplement, a cap, such as a child resistant cap, coupled to a neck portion of the body, and a dosage cup coupled to the cap. The dosage cup has at least four axial shoulders on an inside surface thereof wherein each has an engaging surface adapted to engage axial ridges of the cap. The dosage cup is coupled to the cap such that a force that is greater, by a predetermined amount, than the weight of the dosage cup is required to remove the dosage cup from the cap. The dosage cup is provided with an indicator adapted to indicate one of the single dosages of the liquid nutritional supplement to be consumed by a user for a predetermined time period.

20 Claims, 4 Drawing Sheets

U.S. PATENT DOCUMENTS

| | | |
|---|---|---|
| D231,083 S | 4/1974 | Campbell |
| 4,150,761 A | 4/1979 | Collins |
| 4,230,230 A | 10/1980 | Mumford |
| 4,273,247 A | 6/1981 | Earls |
| 4,320,844 A | 3/1982 | Cooper et al. |
| D276,592 S | 12/1984 | Cox |
| 4,553,678 A | 11/1985 | Thorsbakken |
| 4,799,590 A | 1/1989 | Furman |
| 4,810,541 A | 3/1989 | Newman et al. |
| 4,834,251 A | 5/1989 | Yu |
| 5,167,339 A | 12/1992 | Takata et al. |
| D340,867 S | 11/1993 | Martin |
| 5,337,539 A | 8/1994 | Barton |
| 5,544,768 A | 8/1996 | Gargione |
| D376,541 S | 12/1996 | Gobe |
| D378,193 S | 2/1997 | Gobe |
| D378,662 S | 4/1997 | Gobe |
| D379,930 S | 6/1997 | Gobe |
| D381,271 S | 7/1997 | Paoloski |
| 5,725,120 A | 3/1998 | Ramsey et al. |
| 5,735,417 A | 4/1998 | Darr et al. |
| 5,758,473 A | 6/1998 | Patelli et al. |
| 5,762,215 A | 6/1998 | Ogden et al. |
| 5,830,547 A | 11/1998 | MacKenzie et al. |
| 5,904,263 A | 5/1999 | St. Pierre et al. |
| 5,957,584 A | 9/1999 | Lakey |
| 6,241,132 B1 | 6/2001 | Morrison |
| D446,727 S | 8/2001 | Cummings |
| D448,676 S * | 10/2001 | Jones et al. ............ D9/542 |
| 6,342,123 B1 | 1/2002 | Rees et al. |
| 6,536,977 B1 | 3/2003 | Hammel |
| D476,234 S | 6/2003 | Steele, IV et al. |
| D476,575 S | 7/2003 | Steele, IV et al. |
| D485,497 S | 1/2004 | Steele, IV et al. |
| D486,069 S | 2/2004 | Steele, IV et al. |
| D533,455 S | 12/2006 | Leck et al. |
| 7,296,700 B2 * | 11/2007 | Steele et al. ............ 215/228 |

FOREIGN PATENT DOCUMENTS

| | | |
|---|---|---|
| DE | 91 07 722 | 8/1991 |
| EP | 0297160 A1 | 1/1989 |
| JP | 56-97206 | 8/1981 |
| JP | 60-116336 | 8/1985 |
| JP | 08-295362 | 11/1996 |
| JP | 10-152155 | 9/1998 |
| WO | WO 93/17937 | 9/1993 |

OTHER PUBLICATIONS

Photographs, pp. 1-14, Jul. 10, 2001.

Office Action issued for Japanese Patent Application No. 2004-521,589, pp. 8 pages (Japanese and English).

* cited by examiner

FIG. 1

START

↓

100 — PROVIDE A LIQUID DISPENSER THAT INCLUDES A BODY HAVING A NECK PORTION, A CHILD-RESISTANT CAP COUPLED TO THE NECK PORTION, AND A DOSAGE CUP COUPLED TO THE CHILD-RESISTANT CAP. THE BODY CONTAINS AN INTEGRAL NUMBER OF SINGLE DOSAGES OF A LIQUID SUPPLEMENT

↓

102 — PROVIDE THE CHILD-RESISTANT CAP WITH A PLURALITY OF AXIAL RIDGES AND ASSOCIATED VALLEYS AROUND AN OUTSIDE PERIMETER THEREOF

↓

104 — PROVIDE THE DOSAGE CUP WITH AT LEAST FOUR AXIAL SHOULDERS ON AN INSIDE SURFACE THEREOF EACH AXIAL SHOULDER HAVING AN ENGAGING SURFACE ADAPTED TO ENGAGE THE AXIAL RIDGES OF THE CHILD-RESISTANT CAP

↓

106 — ENGAGE THE AXIAL SHOULDERS OF THE DOSAGE CUP WITH THE PLURALITY AXIAL RIDGES OF THE CAP

↓

108 — COUPLE THE DOSAGE CUP TO THE CHILD-RESISTANT CAP SUCH THAT A FORCE THAT IS GREATER, BY A PREDETERMINED AMOUNT, THAN THE WEIGHT OF THE DOSAGE CUP IS REQUIRED TO REMOVE THE DOSAGE CUP FROM THE CHILD-RESISTANT CAP

↓

110 — PROVIDE THE BODY WITH A PAIR OF OPPOSED INDENTATIONS ADJACENT THE NECK PORTION FOR THE USER TO EASILY HANDLE THE LIQUID DISPENSER

↓

112 — PROVIDE THE DOSAGE CUP WITH AN INDICATOR ADAPTED TO INDICATE ONE OF THE SINGLE DOSAGES OF THE LIQUID TO BE CONSUMED BY THE USER FOR A PREDETERMINED TIME PERIOD

↓

FINISH

FIG. 4

START

↓

400 — PROVIDE A PLURALITY OF CONTAINERS, EACH CONTAINER CONTAINING A SINGLE DOSAGE OF THE LIQUID NUTRITIONAL SUPPLEMENT

↓

402 — COUPLE THE CONTAINERS TOGETHER IN SUCH A MANNER THAT ALL OF THE CONTAINERS COMBINED EQUAL A REQUIRED TOTAL DOSAGE OVER A PREDETERMINED TIME PERIOD

↓

FINISH

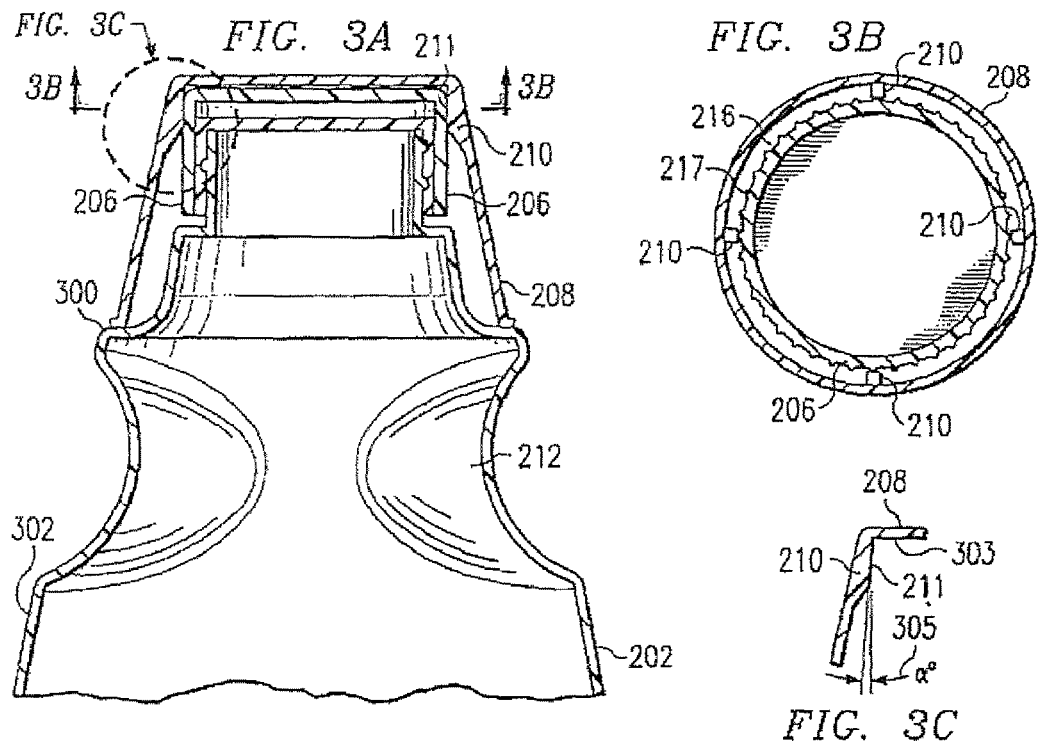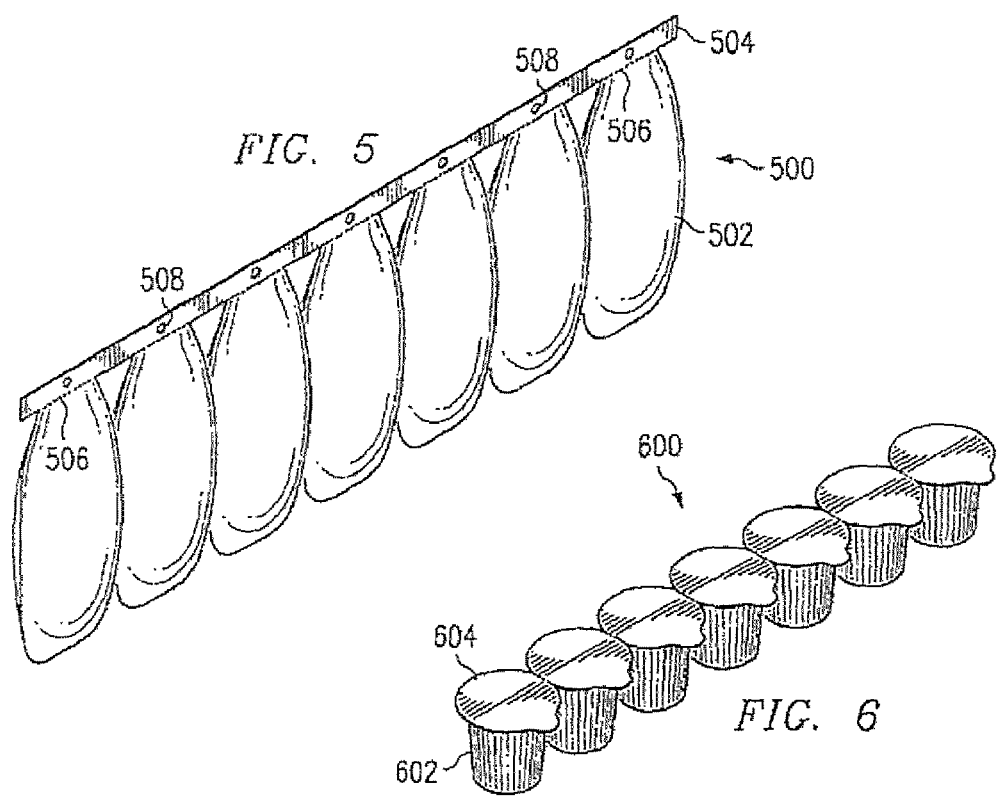

METHOD AND APPARATUS FOR METERING LIQUID NUTRITIONAL SUPPLEMENTS

CROSS-REFERENCE TO RELATED APPLICATIONS

This application is a continuation-in-part of U.S. patent application Ser. No. 10/193,382 entitled "METHOD AND APPARATUS FOR METERING LIQUID NUTRITIONAL SUPPLEMENTS TECHNICAL FIELD OF THE INVENTION," filed Jul. 11, 2002, the disclosure of which is hereby incorporated herein by reference.

TECHNICAL FIELD

The present invention relates generally to the field of liquid supplements and, more particularly, to a method and apparatus for metering liquid nutritional supplements.

BACKGROUND OF THE INVENTION

In order to maintain optimum health, many people are encouraged to take nutritional supplements, such as vitamin and mineral supplements. These supplements are typically in solid form, such as pills, tablets, or capsules, which result in various problems. One of these problems is that solid form supplements are oftentimes hard to chew and/or swallow. In addition, solid form supplements are often bitter tasting and many times a consumer has to take more than one pill, tablet, or capsule, which makes them even harder to swallow. More importantly, consumers sometimes forget how many dosages they are supposed to consume and how often they are supposed to take them. This may lead to either under-dosage or over-dosage of the supplement.

Supplements less often come in liquid form; however, these liquid supplements may also lead to under-dosage or over-dosage because a consumer typically has to use a utensil, such as a tablespoon or teaspoon, to take the supplement. Not only does this result in either under-dosage or over-dosage, but can lead to spillage and waste of the supplement. Dosage cups may be used to take the liquid supplement; however, existing dosage cups may not be readily attainable. For example, a consumer may misplace it, it may be in the dishwasher, or a child may have hidden it.

A dosage cup that is removably fixed to the cap of a container has, in the past, had internal structures that may contain too much bacteria and are hard to keep clean and sterile. For example, in U.S. Pat. No. 4,150,761, a dosage cup is removably fixed to a cap of a container by numerous ribs that fit within grooves on the outside of the cap so that the dosage cup and cap can be removed from the container together. Additional internal structures on the inside of the dosage cup are provided to regulate axial travel of the dosage cup. A similar dosage cup is shown in U.S. Pat. No. 4,273,247. However, the dosage cup shown therein has a cup collar with retaining lugs to secure the dosage cup to the cap and additional axial ribs for additional stiffening for the cup collar.

BRIEF SUMMARY OF THE INVENTION

A method and apparatus for metering a liquid nutritional supplement is disclosed and provides a liquid dispenser having a body that contains a predetermined number of single dosages of the liquid nutritional supplement, a cap, such as a child resistant cap, coupled to a neck portion of the body, and a dosage cup coupled to the cap. The dosage cup has at least four axial shoulders on an inside surface thereof that each has an engaging surface adapted to engage axial ridges of the cap. The dosage cup is coupled to the cap such that a force that is greater, by a predetermined amount, than the weight of the dosage cup is required to remove the dosage cup from the cap, to and providing the dosage cup with an indicator adapted to indicate one of the single dosages of the liquid nutritional supplement to be consumed by a user for a predetermined time period.

Embodiments of the invention provide a number of technical advantages. Embodiments of the invention may include all, some, or none of these advantages. One technical advantage is that a consumption of liquid nutritional supplements, such as dietary supplements, vitamin supplements, joint care supplements, etc., may be metered with accuracy. This allows a consumer to feel confident that he or she is receiving the correct dosage of liquid nutritional supplement for each required time period. Another technical advantage of one embodiment of the present invention is that a liquid dispenser containing the liquid nutritional supplement may be used that has a simplified dosage cup attached to a child-resistant cap. This relieves a user of having to use a separate dosage cup or other measuring device, such as a tablespoon. The simple dosage cup has very little structure on an inside thereof, which makes it much easier to keep clean and sterile. Additionally, reduced structure on the inside facilitates easy removal from the child-resistant cap while still providing enough grip on the cap to keep it secure during storage and/or transportation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1 is a flowchart demonstrating an example method of metering a liquid nutritional supplement in accordance with one embodiment of the present invention;

FIGS. 3A, 3B and 3C are various cross-sectional views of a child-resistant cap and a dosage cup of the liquid dispenser of FIGS. 2A and 2B;

FIG. 4 is a flowchart demonstrating an example method of metering a liquid nutritional supplement in accordance with one embodiment of the present invention;

FIG. 5 illustrates an example of the method of FIG. 4 by coupling a plurality of pouches together, in which each pouch contains a single dosage of the liquid nutritional supplement; and FIG. 6 illustrates another example of the method of FIG. 4 by coupling a plurality of containers having peel-away lids together, in which each container contains a single dosage of the liquid nutritional supplement.

DETAILED DESCRIPTION OF THE INVENTION

Figures 2A, 2B:
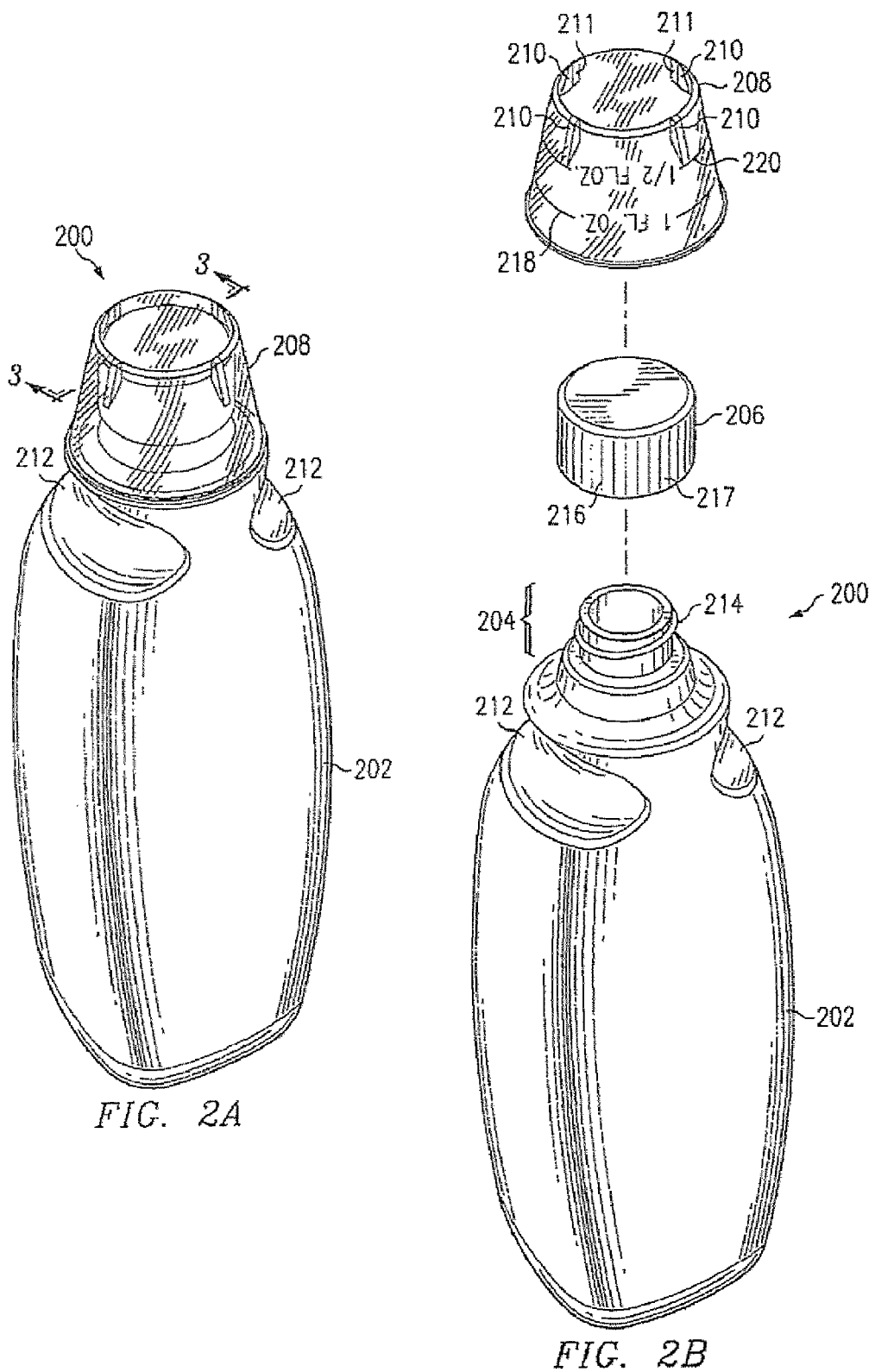
FIGS. 2A and 2B are perspective and exploded views, respectively, of an example liquid dispenser for use in one embodiment of the present invention.

Example embodiments of the present invention and their advantages are best understood by referring now to FIGS. 1-6 of the drawings, in which like numerals refer to like parts.

FIG. 1 is a flowchart demonstrating an example method of metering a liquid nutritional supplement in accordance with one embodiment of the present invention. With additional reference to FIGS. 2A and 2B, the method in FIG. 1 begins at step 100 where a liquid dispenser 200 is provided. Liquid dispenser 200 includes a body 202 having a neck portion 204, a child-resistant cap 206 coupled to neck portion 204, and a dosage cup 208 coupled to child-resistant cap 206. Body 202 contains the liquid nutritional supplement to be consumed by a user. In the illustrated embodiment, body 202 contains an integral number of single dosages of the liquid nutritional supplement.

The method continues at step 102 where child-resistant cap 206 is provided with a plurality of axial ridges 216 and a plurality of associated valleys 217 around an outside perimeter thereof. At step 104, dosage cup 208 is provided with at least four axial shoulders 210 on an inside surface thereof. Each axial shoulder 210 has an engaging surface 211 that is adapted to engage the axial ridges 216 of child-resistant cap 206. At step 106, axial shoulders 210 engage axial ridges 216 of child-resistant cap 206. Hence, dosage cup 208 is coupled to child-resistant cap 206, as denoted by step 108, such that a force that is greater, by a predetermined amount, than the weight of dosage cup 208 is required to remove dosage cup 208 from child-resistant cap 206. The weight of dosage cup 208 is defined by the mass of dosage cup 208 times the acceleration of gravity. One technical advantage of the present invention is that dosage cup 208 is easily removable from child-resistant cap 206 without having to exert a great force on dosage cup 208 and without having to use the bulky and complicated systems used on previous liquid dispensers. The interaction of dosage cup 208 and child-resistant cap 206 is described in further detail below in conjunction with FIGS. 3A-3D.

At step 110, body 202 is provided with a pair of opposed indentations 212 adjacent neck portion 204 so that the user may easily handle the liquid dispenser. Opposed indentations 212 are described in more detail below. Dosage cup 208 is provided, at step 112, with at least one indicator adapted to indicate one of the single dosages of a liquid nutritional supplement to be consumed by the user over a predetermined time period. As illustrated in FIG. 2B, an indicator may be, for example, a one fluid ounce indicator 218 or a one-half fluid ounce indicator 220 as shown. This ends one example method of metering a liquid nutritional supplement for a user in accordance with one embodiment of the present invention. Another example method of metering a liquid nutritional supplement is described further below in conjunction with FIG. 4. Before the description of FIG. 4, however, liquid dispenser 200 is described in more detail below in conjunction with FIGS. 2A through 3B.

FIGS. 2A and 2B are perspective and exploded views, respectively, of an example liquid dispenser 200 for use in one embodiment of the present invention. As illustrated in FIGS. 2A and 2B, liquid dispenser 200 generally includes body 202, cap 206, and dosage cup 208.

Body 202 is illustrated in FIGS. 2A and 2B to have a generally rectangular barrel shape with indentations 212 formed in an upper portion of body 202 adjacent neck portion 204. Body 202 may have other shapes or configurations suitable for containing a liquid nutritional supplement therein. The liquid nutritional supplement contained within body 202 may be any suitable liquid nutritional supplement, such as a dietary supplement, a vitamin supplement, a joint care supplement, a calcium supplement, a vitamin E supplement, or other suitable supplements. As an example, the joint care supplement may consist of glucosamine, chondroitin, MSM, and collagen. Body 202, in one embodiment, is formed from a polymer, such as HDPE; however, body 202 may be formed from other suitable materials. An interior volume of body 202 may be any volume suitable to hold a predetermined number of single dosages of liquid nutritional supplement. As described above, in one embodiment, body 202 contains an integral number of single dosages of liquid nutritional supplement.

Indentations 212 may have any suitable size, shape, and contour. Generally, indentations 212 are designed in such a manner that one of the indentations fits the general shape of a user's thumb and the other fits the general shape of a user's forefinger. There may be any number of indentations formed in body 202. Indentations 212 facilitate the easy handling of liquid dispenser 200 during transportation or use, especially when dispensing liquid.

Neck portion 204 may have any suitable configuration and typically includes at least one thread 214 formed thereon. Thread 214 is adapted to accept internal threads of cap 206 (not explicitly shown) to securely couple 206 to body 202. Neck portion 204 may have any suitable length and any suitable diameter. Neck portion 204 is typically formed integral with body 202; however, neck portion 204 may alternatively be coupled to body 202 in other suitable manners. Neck portion 204 is typically formed from the same material as body 202, which may be a polymer or other suitable material.

Cap 206 is adapted to couple to neck portion 214. Any suitable cap may be utilized for liquid dispenser 200; however, in the illustrated embodiment, cap 206 is a child-resistant cap. Child-resistant caps function to prevent a child or mentally challenged person to remove the cap and have access to the contents of the liquid dispenser. In the context of the present invention, a child-resistant cap is a cap in which it takes more than just a twisting action to remove the cap from the bottle. For example, as illustrated in FIGS. 2A and 2B, cap 206 is adapted to work in conjunction with thread 214 on neck portion 204 such that a user has to push down on cap 206 to rotatably remove cap 206. Accordingly, a user pushes down on cap 206 and then rotates it so that it may be removed from neck portion 204. Other suitable child-resistant caps are contemplated by the present invention.

As illustrated in FIG. 2B, cap 206 has a plurality of axial ridges 216 and a plurality of associated valleys 217 on an outside perimeter thereof. Cap 206, however, may have other suitable outside surfaces, such as a knurled surface, a smooth surface, or other suitable surfaces. Cap 206 is formed from any suitable material, such as a polymer or other suitable material, and may have any suitable size and configuration.

Dosage cup 208 is coupled to cap 206 such that a user has to exert a force on dosage cup 208 that is greater, by a predetermined amount, than the weight of dosage cup 208 to remove dosage cup 208 from cap 206. Dosage cup 208, in one embodiment, is formed from a polymer, such as polypropylene; however, dosage cup 208 maybe formed from other suitable materials. In addition, dosage cup 208 may be transparent, translucent, or non-transparent. Dosage cup 208 may also have any suitable configuration. In one embodiment, the shape and configuration of the wall of dosage cup 208 is such that it conforms to the general shape of an upper portion of body 202 so that a smooth and attractive appearance may be achieved. Although not explicitly illustrated in FIGS. 2A and 2B, a shrinkwrap may be coupled to an outside surface of liquid dispenser 200 for packaging, shipping, and displaying purposes. In addition, the shrinkwrap ensures that dosage cup 208 stays coupled to cap 206 during movement of liquid dispenser 200.

Dosage cup 208, as described above, includes at least four axial shoulders 210 that facilitate the coupling of dosage cup 208 to cap 206. The interaction of dosage cup 208 and cap 206 is described in detail below in conjunction with FIGS. 3A-3D. Also described above, dosage cup 208 also has one or more indicators 218, 220 to indicate a single dosage of the liquid nutritional supplement inside body 202. As described above, indicator 218 is a one fluid ounce indicator and indicator 220 is a one-half fluid ounce indicator. Other suitable indicators may be utilized and these indicators may have any suitable markings to insure that the correct dosage is obtained. One technical advantage of the present invention is that body 202 has an integral number of single dosages of the liquid nutritional supplement contained therein and dosage cup has an indicator 218, 220 that indicates a single dosage of the liquid nutritional supplement within body 202. To illustrate the technical advantage, if body 202 contains sixteen ounces of a liquid nutritional supplement and indicator 218 is a one fluid ounce indicator, then the user is ensured that, if they are required to take one dosage per day, the contents of body 202 will be finished in sixteen days because each day the user will be using dosage cup 208 and associated indicator 218 to take one fluid ounce of the liquid nutritional supplement inside body 202.

FIG. 3A is a cross-sectional view of a top portion of liquid dispenser 200, and FIG. 3B is a cross-sectional view of cap 206 and dosage cup 208 illustrating the interaction of body 202, cap 206, and dosage cup 208 in more detail. As illustrated in FIGS. 3A and 3B, shoulders 210, via engaging surfaces 211, engage axial ridges 216 on cap 206 to couple dosage cup 208 to cap 206. As described above, dosage cup 208 couples to cap 206 in such a manner that the user only has to exert a force on dosage cup 208 that is greater, by a predetermined amount, than the weight of dosage cup 208 to remove dosage cup 208 from cap 206. This is facilitated by having engaging surfaces 211 of dosage cup 208 coincide with a circle having a diameter that is slightly less than the outside diameter of axial ridges 216 of cap 206. In other words, the distance between diametrically opposed points on engaging surfaces 211 of axial shoulders 210 is slightly less than the diameter of the outside surfaces of axial ridges 216 when dosage cup 208 is coupled to cap 206. This type of force fit allows a user to easily remove dosage cup 208 when a dosage of the liquid nutritional supplement inside body 202 is required to be consumed, while still providing enough grip on between engaging surfaces 211 and axial ridges 216 to keep it secure during storage and/or transportation.

In one embodiment, an adequate grip is obtained by substantially matching a taper of engaging surfaces 211 with a taper of axial ridges 216. Substantially matching the tapers allows more surface area of engaging surfaces 211 to contact axial ridges 216 to provide more frictional force. As illustrated in FIG. 3C, engaging surfaces 211 start proximate a base 303 of dosage cup 208 and taper toward the wall of dosage cup 208. In one embodiment, the degree of taper (as denoted by alpha 305) is one degree; however, other suitable tapers may be utilized.

Referring back to FIG. 3A, dosage cup 208 has a length that extends all the way down to a top portion 300 of body 202. Dosage cup 208, however, may have other suitable lengths. In addition, the outside surface of dosage cup 208 generally conforms to an outside surface 302 of body 202 so that a shrink wrap may be applied to liquid dispenser 200. In a particular embodiment, the outside surface of the wall of dosage cup 208 includes a taper to substantially match a taper of top portion 300 of body 202.

Figure 3D:
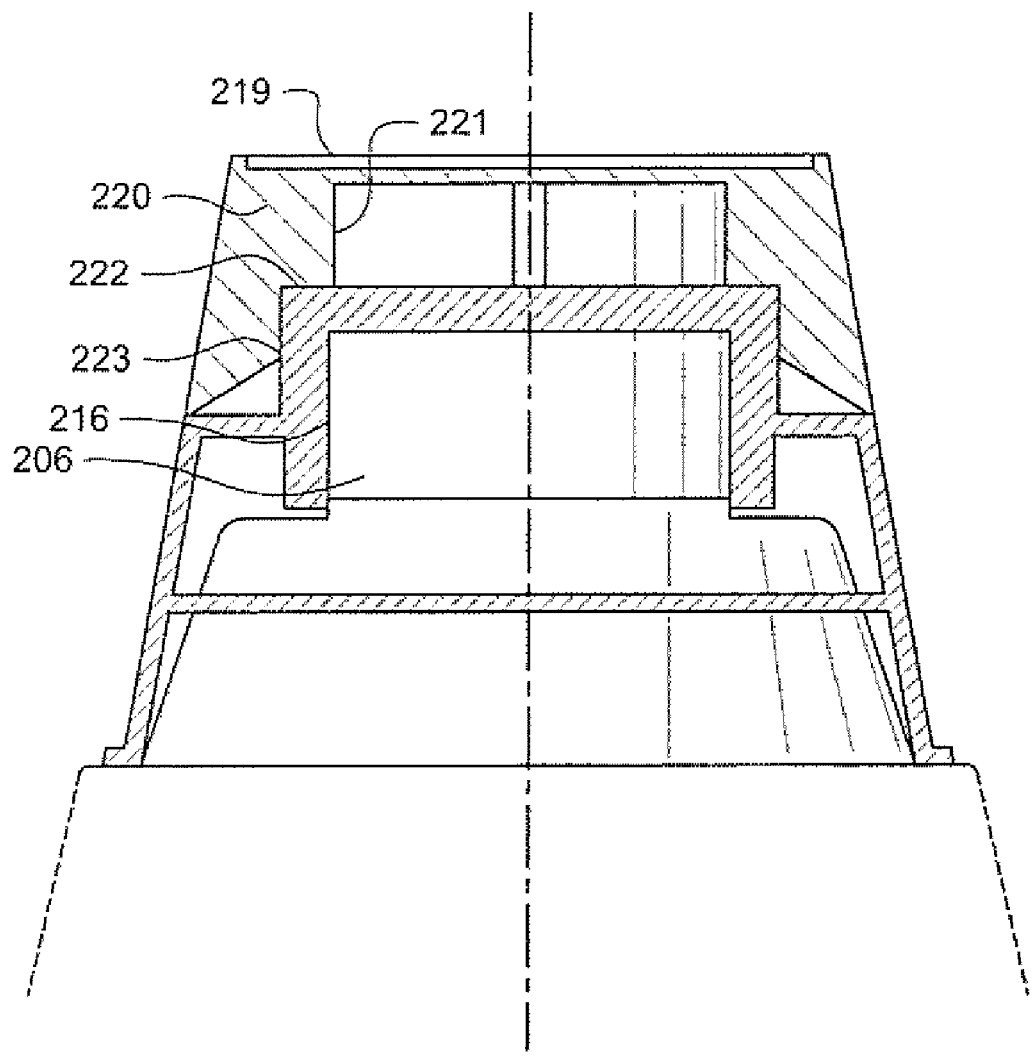
FIG. 3D is a cross-sectional view of another embodiment of a rotatably removable cap and a dosage cup of the liquid dispenser of FIGS. 2A and 2B.

FIG. 3D is a cross-sectional view of a top portion of another embodiment of liquid dispenser 200. Similar to the embodiment illustrated by FIG. 3A, dosage cup 219 couples to cap 206 in such a manner that the user only has to exert a force on dosage cup 219 that is greater, by a determined amount, than the weight of dosage cup 219 to remove dosage cup 219 from cap 206. The dosage cup 219 includes at least four axial shoulders 220 that facilitate the coupling of dosage cup 219 to cap 206. Axial shoulder 220 includes projection 221 that creates perpendicular engaging surfaces 222 and 223. When dosage cup 219 is coupled to cap 206, horizontal engaging surface 222, being parallel in part with cap 206, is in contact with the surface of cap 206. Vertical engaging surface 223 is parallel to and in contact with axial ridges 216 when the dosage cup 219 is coupled to cap 206. The distance between diametrically opposed points on engaging surfaces 223 of axial shoulders 220 is slightly less than the diameter of the outside surfaces of axial ridges 216 when dosage cup 219 is coupled to cap 206. Again, this is the same type of three fit discussed with respect to embodiments of dosage cup 208 (see FIGS. 3A-3C) that enables easy removal of dosage cup 219 while providing enough grip between engaging surfaces 223 and axial ridges 216 to keep the dosage cup secured to the cap 219 during storage and/or transportation.

One technical advantage of the present invention is that dosage cup 208 is 30 devoid of any projections on an inside surface thereof other than axial shoulders 210. This makes it much easier for a user to keep dosage cup 208 clean and sterile, thereby reducing any deleterious effects of a dirty dosage cup 208 and combating the benefits of the liquid nutritional supplement contained therein. In addition, a dosage cup 208 having such little structure on an inside surface thereof makes it easier to manufacture in a more cost-efficient manner.

FIG. 4 is a flowchart demonstrating an example method of metering a liquid nutritional supplement in accordance with one embodiment of the present invention. At step 400, a plurality of containers are provided, wherein each container contains a single dosage of the liquid nutritional supplement. At step 402, the containers are coupled together in such a manner that all of the containers combined equal a required total dosage over a predetermined time period for a user. For example, there may be seven containers coupled together, one container for each day of the week. Any suitable containers may be utilized. Two such examples of containers utilized in the method outlined in FIG. 4 are described below in conjunction with FIGS. 5 and 6.

FIG. 5 illustrates an example of the method of FIG. 4 by coupling a plurality of pouches 500 together, in which each pouch 500 contains a single dosage of a liquid nutritional supplement. As described above, this liquid nutritional supplement may be any suitable liquid nutritional supplement, such as a dietary supplement, a vitamin supplement, a joint care supplement, a calcium supplement, or a vitamin E supplement. Each pouch 500 has a body section 502 and a top portion 504 with a perforation 506 disposed therebetween. Body portion 502 contains the single dosage of the liquid nutritional supplement. The liquid nutritional supplement is accessed by a user tearing off top portion 504 via perforation 506. A hole formed in top portion 504 may be used to store pouch 500 for easy access. Pouch 500 may be formed from any suitable material and may be formed in any suitable configuration. Although shown as being coupled along the sides of the pouches, pouches 500 may be coupled together in any suitable manner. Seven pouches are shown in FIG. 5, which indicates one single dosage for each day of a week. The present invention, however, contemplates any number of pouches 500 being coupled together. For example, there may be fourteen pouches 500 coupled together for a two-week supply of single dosages or there may be thirty pouches 500 coupled together for a one 12 month supply of single dosages. A chip board may be used to couple pouches 500 together.

FIG. 6 illustrates another example of the method of FIG. 4 by coupling a plurality of containers 600 having peel away lids 604 together, in which each container 600 contains a single dosage of a liquid nutritional supplement. The liquid nutritional supplement contained in containers 600 may be any suitable liquid nutritional supplement, such as those described above. The method illustrated in FIG. 6 is similar to that shown in FIG. 5; however, the type of container is different in that containers 600 resemble a "coffee creamer." Each container 600 includes a body portion 602 having peel away lid 604 coupled thereto. Containers 600 may be coupled to each other in any suitable manner and may be other configurations than that shown in FIG. 6. Again, seven containers 600 are shown in FIG. 6 to indicate one single dosage for each day of the week, for example.

Although embodiments of the invention and their advantages are described in detail, a person skilled in the art could make various alterations, additions, and omissions without departing from the spirit and scope of the present invention as defined by the appended claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for metering a liquid nutritional supplement, comprising:
    providing a liquid dispenser, the liquid dispenser comprising:
        a body having a neck portion, the neck portion having at least one thread thereon and providing the body with a pair of opposed indentations adjacent the neck portion for the user to easily handle the liquid dispenser;
        a cap adapted to couple to the neck portion and work in conjunction with the thread such that the user has to push down on the cap to rotatably remove the cap from the neck portion, the cap having a plurality of axial ridges around an outside perimeter thereof;
        a dosage cup adapted to couple to the cap;
        at least four axial shoulders on an inside surface of the dosage cup, each axial shoulder having an engaging surface adapted to engage the axial ridges, the engaging surface starting proximate a base of the dosage cup and tapering from a point proximate said base toward a wall of the dosage cup along the entire length of said engaging surface;
    coupling the dosage cup to the cap such that a force that is greater, by a predetermined amount, than the weight of the dosage cup is required to remove the dosage cup from the cap; and
    metering a dosage of the liquid nutritional supplement to be consumed by a user for a predetermined time period using the dosage cup having an indicator.

2. The method of claim 1, wherein the liquid nutritional supplement is selected from the group consisting of a dietary supplement, a vitamin supplement, and a joint care supplement.

3. The method of claim 1, further comprising providing the body with a predetermined number of single dosages of the liquid nutritional supplement.

4. The method of claim 1, wherein the cap is a child-resistant cap.

5. The method of claim 1, wherein said at least four axial shoulders on said inside surface of the dosage cup include two pair of diametrically opposed axial shoulders, the distance between diametrically opposed joints on the engaging surfaces of each pair of shoulders slightly less than a diameter of an outside surface of the axial ridges of the cap when the dosage cup is coupled to the cap.

6. The method of claim 1, further comprising:
    associating the engaging surfaces with a circle having a diameter slightly less than an outside diameter of the axial ridges of the cap when the dosage cup is coupled to the cap.

7. The method of claim 1, further comprising:
    providing the dosage cup with a plurality of indicators, each indicator adapted to meter a single dosage of the liquid nutritional supplement.

8. The method of claim 1, further comprising:
    providing the wall of the dosage cup with a taper that substantially matches a taper of a top portion of the body when the dosage cup is coupled to the cap.

9. A dispenser for metering a liquid nutritional supplement, comprising:
    a body having a neck portion, the neck portion having at least one thread thereon wherein the body includes a pair of opposed indentations adjacent the neck portion for the user to easily handle the liquid dispenser;
    a child-resistant cap adapted to couple to the neck portion, the child-resistant cap having a plurality of axial ridges around an outside perimeter thereof;

a dosage cup adapted to couple to the child-resistant cap such that a user has to exert a force on the dosage cup that is greater, by a predetermined amount, than the weight of the dosage cup to remove the dosage cup from the child-resistant cap; and at least four axial shoulders on an inside surface of the dosage cup, each axial shoulder having an engaging surface adapted to engage the axial ridges, the engaging surface starting proximate a base of the dosage cup and tapering from a point proximate said base toward a wall of the dosage cup along the entire length of said engaging surface.

10. The dispenser of claim 9, wherein the at least four axial shoulders comprise two pair of diametrically opposed axial shoulders, wherein the distance between diametrically opposed points on the inside surfaces of each pair of shoulders is slightly less than a diameter of an outside surface of the axial ridges of the child-resistant cap when the dosage cup is coupled to the cap.

11. The dispenser of claim 9, wherein the at least four axial shoulders each have inside surfaces that coincide with a circle having a diameter slightly less than an outside diameter of the axial ridges of the child-resistant cap when the dosage cup is coupled to the child-resistant cap.

12. The dispenser of claim 9, wherein the dosage cup includes an indicator adapted to indicate a single dosage of the liquid nutritional supplement.

13. The dispenser of claim 9, wherein the body houses an amount of the liquid nutritional supplement equal to a plurality of single dosages each having an equal amount.

14. The dispenser of claim 9, wherein the wall of the dosage cup includes a taper to substantially match a taper of a top portion of the body when the dosage cup is coupled to the child-resistant cap.

15. The dispenser of claim 9, wherein the child-resistant cap is adapted to work in conjunction with the thread such that the user has to push down on the child-resistant cap to rotatably remove the child-resistant cap from the neck portion.

16. A dispenser for metering a liquid nutritional supplement, comprising:

a body having a neck portion, the neck portion having at least one thread thereon;

a rotatably removable cap adapted to couple to the neck portion, the cap having a plurality of axial ridges around an outside perimeter thereof;

a dosage cup adapted to couple to the cap such that a user has to exert a force on the dosage cup that is greater, by a predetermined amount, than the weight of the dosage cup to remove the dosage cup from the rotatably removable cap; and at least three axial shoulders on an inside surface of the dosage cup, each axial shoulder having perpendicular engaging surfaces, wherein each of said perpendicular surfaces is adapted to engage the axial ridges, with the distance between diametrically opposed points on each of said perpendicular engaging surfaces being slightly less than diameter of the outside surfaces of the axial ridges, and wherein the inside surface of said dosage cup has a smooth frustoconical shape, the inside surface being devoid of any projections other than said axial shoulders.

17. The dispenser of claim 16, wherein the dosage cup includes an indicator adapted to indicate a single dosage of the liquid nutritional supplement.

18. The dispenser of claim 16, wherein the dosage cup includes a plurality of indicators, each indicator adapted to indicate a single dosage of the liquid nutritional supplement.

19. The dispenser of claim 17, wherein the single dosage comprises a required dosage for a predetermined time period for the user.

20. The dispenser of claim 16, wherein the body houses an amount of the liquid nutritional supplement equal to a plurality of single dosages each having an equal amount.

\* \* \* \* \*